United States Patent [19]

Myers et al.

[11] Patent Number: 4,736,989

[45] Date of Patent: Apr. 12, 1988

[54] DUAL DECELERATION AND PRESSURE-SENSITIVE PROPORTIONING VALVE

[75] Inventors: Lawrence R. Myers; Lloyd G. Bach, both of South Bend, Ind.; Robert F. Gaiser, Stevensville, Mich.

[73] Assignee: Allied Corporation, Morristown, N.J.

[21] Appl. No.: 924,966

[22] Filed: Oct. 30, 1986

[51] Int. Cl.⁴ .......................... B60T 13/00; B60T 8/00; B60T 8/46

[52] U.S. Cl. .................................. 303/6 C; 303/24.1; 303/84 R

[58] Field of Search .................. 303/6 C, 24 A, 24 B, 303/24 C, 24 F, 24 R, 84 A, 84 R; 188/349

[56] References Cited

U.S. PATENT DOCUMENTS

| 3,252,740 | 5/1966 | Stelzer | 303/24 F |
| 3,727,987 | 4/1973 | Shellhouse | 303/6 C |
| 4,281,880 | 8/1981 | Gaiser et al. | 188/349 |
| 4,284,308 | 8/1981 | Hayashida | 303/6 C |

Primary Examiner—Andres Kashnikow
Assistant Examiner—Timothy Newholm
Attorney, Agent, or Firm—Larry J. Palguta; Ken C. Decker

[57] ABSTRACT

A dual proportioning valve assembly (10) for a vehicle braking system comprises a housing (12) having a pair of inlets (29, 30) and outlets (31, 32), a bore (25) within the housing (12) containing a pair of oppositely disposed differential pistons (40, 140) biased apart by a main spring (200). The first and second differential pistons (40, 140) have associated first and second poppet valves (50, 150) which control fluid flow between the respective inlet and outlet. A cage member (60) extends within the first differential piston (40) and is connected with the first poppet valve (50), the cage member (60) extending longitudinally within the bore (25) and having an interior chamber (70) with an inertia-sensing mass (80) therein. The inertia-sensing mass (80) engages a third poppet valve (94) which controls fluid flow between the interior chamber (70) and a variable volume chamber (100) defined by the cage member (60) and a stationary piston (160) which engages the cage member (60). The stationary piston (160) abuts a shoulder (13) of the housing (12) and extends into the second differential piston (140) where it is connected with the second poppet valve (150) controlling fluid flow between the respective inlet (30) and outlet (32). The stationary piston (160) and cage member (60) are biased apart by a plunger spring (205).

30 Claims, 3 Drawing Sheets

DUAL DECELERATION AND PRESSURE-SENSITIVE PROPORTIONING VALVE

This invention relates to a dual deceleration and pressure-sensitive proportioning valve assembly for the brake system of a vehicle.

U.S. Pat. Nos. 4,595,243 and 4,652,058 and 4,679,864 disclose proportioning valve assemblies which include an inertiasensitive object disposed within a reservoir, the reservoir communication by means of a channel with the proportioning valve and fluid flow through the channel controlled by a valve engaged by the inertia-sensitive object. Co-pending patent application No. 944,079 illustrates a proportioning valve assembly connected with a torque sensing valve. Copending patent application No. 799,219 discloses an entirely self-contained deceleration and pressure-sensitive proportioning valve assembly which eliminates the reservoir and channel and which has a single inlet and outlet. It is desirable to provide an entirely self-contained dual deceleration and pressuresensitive proportioning valve assembly which does not require a reservoir or fluid-containing chamber, and which also eliminates a channel between the reservoir and proportioning valve assembly. It is desirable to reduce significantly the fluid displacement losses accompanying a proportioning valve assembly which includes two proportioning valves housed in adjacent bores of the housing. The proportioning valve assembly should eliminate or reduce any side-to-side pressure differentials caused by each of the separate proportioning valves having their own main springs, and also should include improved bleedability. The present invention provides a solution by providing an entirely self-contained dual deceleration and pressure-sensitive proportioning valve assembly which may be disposed anywhere within the brake circuit between the master cylinder and wheel brake cylinders. No reservoir or external fluid communication is required in order to replenish the dual valve assembly, and the channel between the reservoir and proportioning valves is eliminated. The fluid displacement losses are significantly reduced by being halved, the side-to-side pressure differential is reduced by including only one main spring within the assembly, and the proportioning valve assembly has improved bleedability. The dual proportioning valve assembly includes two pressure responsive assemblies, one operating by displacement and the other by loading. Additionally, the proportioning valve assembly includes inherent high pressure damping in order to compensate for a "spike" application of the vehicle brakes. The invention provides a low cost, easily manufactured valve assembly.

The dual proportioning valve assembly of the present invention comprises a housing having a pair of inlets and a pair of outlets, first and second differential pistons disposed at opposite ends of a bore within said housing and biased apart from one another by resilient means, first and second poppet valve means each associated with a respective differential piston, a cage member and a stationary piston disposed between said differential pistons, the cage member connected with said first poppet valve means and extending longitudinally to have an internal chamber with an inertia-sensing mass therein, the stationary piston connected with said second poppet valve means and engaging the cage member to define therewith a variable volume chamber, third poppet valve means disposed at an end of said variable volume chamber and engaged by the inertia-sensing mass, the valve assembly responsive to inlet and outlet pressures so that the valve assembly provides pressures at the outlet reduced from the pressures at the inlets, and the inertiasensing mass responsive to deceleration of the vehicle in order to effect closure of said third poppet valve means and cooperate in reducing pressure at the outlets.

The accompanying drawings show, for the purpose of a exemplification and without limiting the claims, an embodiment illustrating the principles of this invention wherein:

Figure 1:
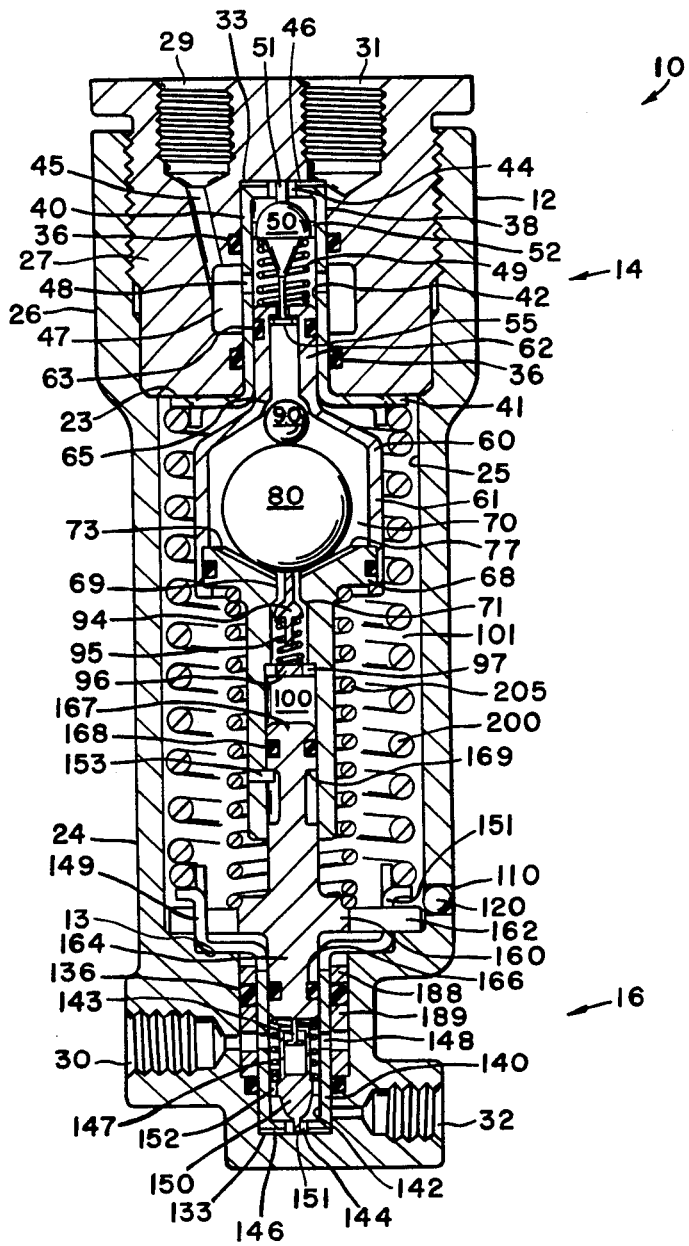
FIG. 1 illustrates in section view the housing having therein the self-contained dual deceleration and pressure-sensitive proportioning valve assembly of the present invention.

FIGS. 1–4 illustrate the dual deceleration and pressure-sensitive proportioning valve assembly of the present invention which is designated generally by reference numeral 10. The proportioning valve assembly 10 is self-contained entirely within a housing 12 that may be disposed separate from the body of the master cylinder (not shown). Copending Application Ser. No. 738,116 discloses a pair of pressure responsive assemblies disposed within a dual bore housing. The dual bore housing communicates with a reservoir containing the inertiasensing mass. It is desirable to reduce by at least half the fluid displacement losses, to eliminate the reservoir, reduce any side-to-side pressure differential, and improve bleedability. The housing 12 contains a stepped bore 25 containing at end 26 a plug or end closure 27 received threadably therein. Plug 27 has an inlet 29 from the primary chamber of the master cylinder and an outlet 31 communicating with the right rear brakes of the vehicle. End 24 of housing 12 includes an inlet 30 receiving fluid pressure from the secondary pressure chamber of the master cylinder and has an outlet 32 communicating with the left rear brake assembly of the vehicle. Housing end 26 and plug 27 include therein a first differential piston 40 received within plug bore 38. Plug bore 38 includes seals 36 which engage the outer periphery of first differential piston 40. Outlet 31 communicates with plug bore 38. A first pressure responsive assembly 14 includes the first differential piston 40 having an interior opening 42 communicating with the inlet 29 by means of passageway 45, chamber 48, and radial openings 48. Within interior opening 42 is first poppet valve means 50 having a poppet end 51 abutting an end wall 33 of plug 27. Poppet end 51 is in piston end opening 44, piston 40 having end slots 46 which permit communication with outlet 31. The first poppet valve means 50 is biased by a spring 49 away from an end 62 of cage member 60, valve end 55 being slidably connected with cage end 62. Cage member 60 includes a seal 63 about end 62, the seal 63 engaging the surface of interior opening 42. End 62 extends longitudinally into an enlarged section 61 of cage member 60, the transition between the portions including a ball valve seat 65. First differential piston 40 includes an enlarged diameter section 41 which abuts a wall 23 of plug 27. The cage member 60 includes a cage member extension 68 having a seal therebetween. Cage member 60 and extension 68 form an interior chamber 70 housing an inertia-sensing mass 80. Disposed above inertia-sensing mass is ball valve member 90 which is retained in position by the inertia-sensing mass 80 and its close proximity to seat 65. Extension 68 includes a valve opening 69 merging with valve seat 71 controlled by third poppet valve means 94. Third poppet valve means 94 is biased by spring 95 positioned on mount 96. Mount 96 has openings 97 which permit fluid flow through valve opening 69, past valve seat 71, through openings 97 and into a variable volume chamber 100.

At housing end 24, a second pressure responsive assembly 16 includes a second differential piston 140 having radial openings 148 which permit fluid pressure from inlet 30 to flow to interior opening 142, out end opening 144, and through end slots 146 to outlet 32. Second differential piston 140 includes thereabout seals 136, and spacers 188 and 189 are disposed about second differential piston 140 and engage the interior surface of stepped bore 25. Second poppet valve means 150 is disposed within the interior opening 142, second poppet valve means 150 having end extension 151 engaging the housing wall 133. Second poppet valve means 150 is biased away from stationary piston or plunger 160 by means of a spring 147. Stationary piston 160 has an end 143 slidably connected with second poppet valve means 150 so that there may be movement therebetween. Second differential piston 140 extends into an enlarged diameter section 149 which has complementary longitudinal openings 151 for receiving therein an enlarged diameter section 162 of stationary plunger 160. Stationary plunger end 164 includes thereabout seal 166 which provides sealing between end 164 and the interior surface of interior opening 142 of piston 140. First differential piston 40 and second differential piston 140 are biased apart by main spring 200. Main spring 200 engages the enlarged diameter sections 49 and 149. Plunger spring 205 biases apart the stationary plunger 160 and cage member 60. Stationary plunger 160 includes an end 167 which contains thereabout a seal 169 and extends within the cage member extension 68. Abutment 153 extends radially inwardly of extension 68 to engage shoulder 169 of end 167 and retain end 167 within extension 68. Stationary plunger end 167 and cage member extension 68 define the variable volume chamber 100.

Pressurized brake fluid enters inlet 29 and 30 and exits the associated outlets 31 and 32. Pistons 40 and 140 are displaced by fluid pressure because of the differential areas defined by the respective exterior and interior diameters. Pressurized fluid may flow through the slidable connection of poppet valve end 55 with end 62 of cage member 60, past valve seat 65 and ball valve member 90 to interior chamber 70, through slots 73, valve opening 69, past seat 71, third poppet valve means 94, and through mount openings 97 to variable volume chamber 100. The pressurized fluid communicated to variable volume chamber 100 is contained entirely within the first pressure responsive assembly 14 comprising differential piston 40, cage member 60, cage member extension 68, and variable volume chamber 100. Pressurized brake fluid received at inlet 30 and exiting outlet 32 is contained entirely within second pressure responsive assembly 16 comprising second differential piston 140 and interior opening 142 bounded at one end by end 164 of stationary plunger 160. Thus, a spring chamber 101 of housing 12 does not contain hydraulic brake fluid therein and is vented at atmosphere by vent 110. Vent 110 includes a snap-in enclosure member 120 which partially plugs vent 110 and allows ventilation therethrough while also providing an abutment for enlarged diameter section 162 of stationary plunger 160. Section 162 abuts shoulder 13 of housing 12.

Figure 5:
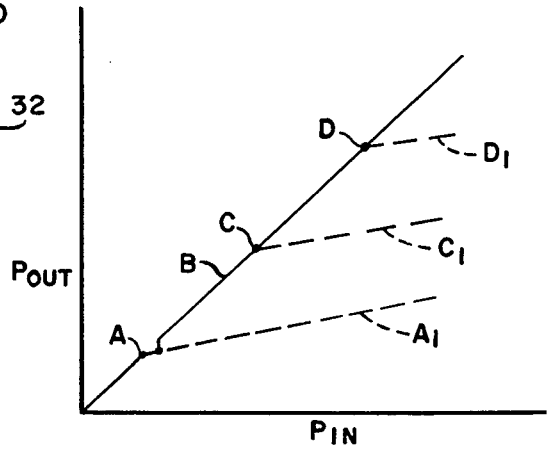
FIG. 5 is a graph of $P_{out}$ versus $P_{in}$ for the proportioning valve assembly of the present invention.

Dual proportioning valve assembly 10 operates in accordance with the pressure curves illustrated in FIG. 5, which are the same as the pressure curves illustrated in U.S. Pat. No. 4,595,243 and copending Application Ser. No. 799,219. During operation, pressure responsive assembly 14 effects the metering of fluid flow by means of displacement of piston 40. The pressure responsive assembly 16 effects the metering of fluid flow by means of loading piston 140 so that it does not move until a break point is reached. Second poppet valve means 150 remains stationary. Referring to FIG. 1, as fluid pressure from the master cylinder (not shown) is communicated through inlets 29 and 30 to stepped bore 25, fluid pressure is communicated through passage 45, chamber 47, radial openings 48, interior opening 42, slots 52, end opening 44, end slots 46, and to outlet 31. Likewise, fluid pressure at inlet 30 is communicated through radial openings 148 to interior opening 142, through slots 152, end opening 144, end slots 146, and out through outlet 32. Fluid pressure communicated to interior opening 42 may flow through the slidable connection of ends 55 and 62, by seat 65, and downwardly to variable volume chamber 100. Thus, the flow paths are open through out proportioning valve assembly 10 so that the output pressure ($P_{out}$) equals the input pressure ($P_{in}$). The input pressure rises as the operator applies the vehicle brakes and if deceleration of the vehicle is sufficient to cause inertia-sensing mass 80 to move up the incline surfaces 77 containing slots 73, then third poppet valve means 94 is permitted to move upwardly and close valve seat 71 by means of the biasing force of spring 95. In order to provide redundant valving and insure that the appropriate restriction of fluid flow occurs, ball valve 90 is moved upwardly toward seat 65 by mass 80. As a result, pressurized fluid is captured within variable volume chamber 100 so that the cage member 60 cannot move downwardly toward housing end 24 and break point A of FIG. 5 is attained. The stationary positioning of cage member 60 maintains first poppet valve means 50 stationary while first differential piston 40 moves downwardly and metering of fluid through end opening 44 is accomplished. As piston 40 moves downwardly, second differential piston 140 moves upwardly against the loading of spring 200 to cause the metering of fluid flow at end opening 144 (see FIG. 2). The input pressure ($P_{in}$) to output pressure ($P_{out}$) relationship will follow the curve $A_1$, indicative of output pressures communicated to the rear wheel brake cylinders of an unloaded vehicle.

Figures 2, 3:
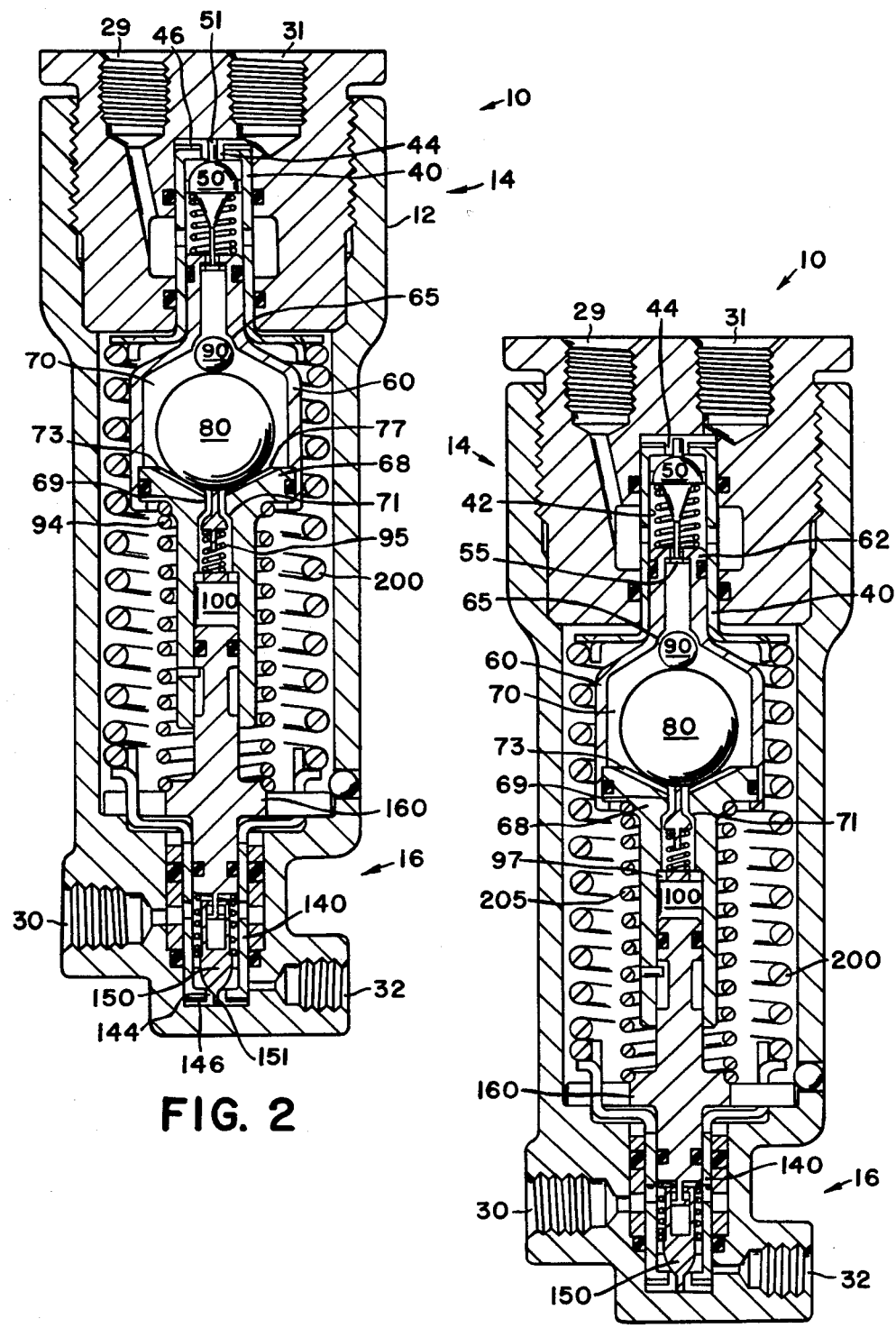
FIG. 2 illustrates the proportioning valve assembly of FIG. 1 operating responsively to fluid pressure received at the inlets.
FIG. 3 illustrates the movement of the differential pistons in response to increased fluid pressure at the inlets.
Figure 4:
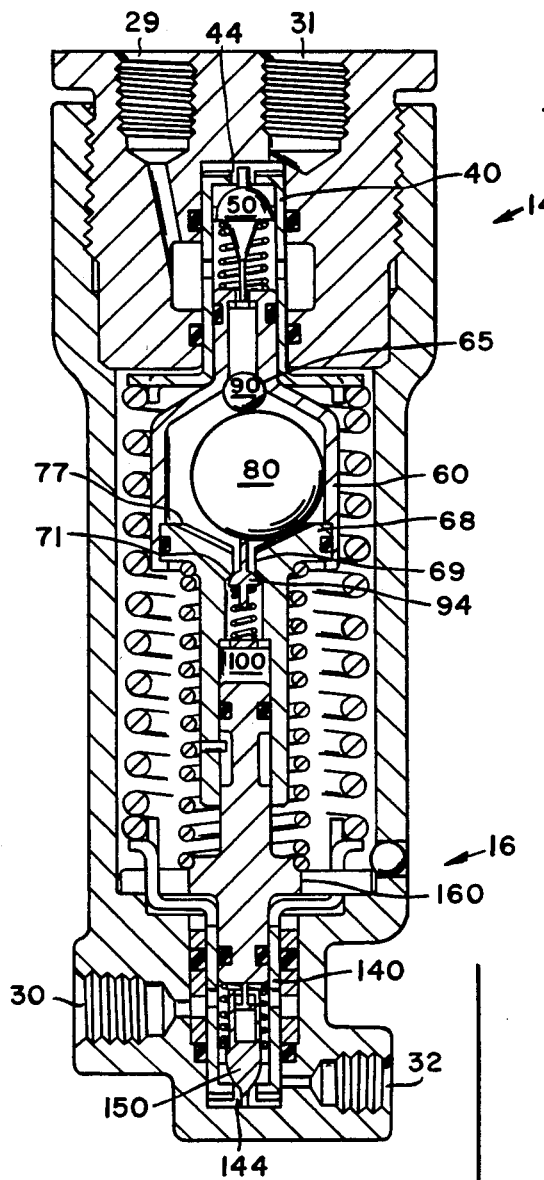
FIG. 4 illustrates the movement of the inertiasensitive object in response to deceleration.

If the deceleration of the vehicle is insufficient to cause tilting of the vehicle and/or displacement of the ball 80 up sloped surfaces 77 because the vehicle is loaded, then increased input pressure ($P_{in}$) exerted on the differential area pistons 40 and 140 causes the first differential area piston 40 to move downwardly (as shown in FIG. 3). Because of main spring 200 disposed between the differential pistons, differential piston 140 is retained in the previous position as differential piston 40 moves downwardly and loads piston 140 via spring 200 in the same manner that a height-sensing valve loads an associated piston. As the pressure increases and the first differential piston 40 moves downwardly, cage member 60 also moves downwardly against the biasing effect of plunger spring 205. Plunger spring 205 retains the stationary plunger 160 in place, along with the assistance of enclosure member 120. Downward movement of cage member 60 effects downward movement of first poppet valve means 50 so that there continues to be metering of fluid flow at end opening 44. As cage member extension 68 moves downwardly, the volume of variable volume chamber 100 decreases and fluid therein flows through openings 97, past seat 71, through valve opening 69, slots 73, chamber 70, past seat 65, the slidable connection at ends 55, 62, into interior opening 42, and toward outlet 31. The loading of differential piston 140 by means of the downward movement of differential piston 40 against main spring 200 causes differential piston 140 to maintain a stationary position relative to second poppet valve means 150 that corresponds to the position of differential piston 40 relative to first poppet valve means 50. Thus, the same fluid flow is communicated to the respective rear brake assemblies and the input pressures equal the output pressures as shown by curve B of FIG. 5. If the increased output pressures ($P_{out}$) provided to the rear wheel brakes causes an increased deceleration of the vehicle such that the inertia-sensing mass 80 goes up the inclined surfaces 77 (see FIG. 4) and permits closure of third poppet valve means 94, then break point C of FIG. 5 is reached. The closure of third poppet valve means 94 prevents any fluid communication through opening 69 so that pressurized fluid is trapped in variable volume chamber 100 and prevents any further downward movement of cage member 60. First differential area piston 40 will continue to move downwardly as a result of the increased input pressure until end opening 44 approaches first poppet valve means 50 and correspondingly second differential piston 140 moves upwardly so that end opening 144 approaches second poppet valves means 150, and restriction of fluid flow by first and second poppet valve means 50 and 150 results in the pressure curve $C_1$ of FIG. 5.

When the brake application ceases, chamber 100 is replenished by the opening of valve seat 71.

The dual deceleration and pressure-sensitive proportioning valves assembly of the present invention may be utilized in a cross-split system or in an axle-axle split system. The proportioning valve assembly does not require a bypass because an inherent bypass is provided. If one of the branches of the split circuit should fail, then there would be less deceleration of the vehicle and the poppet valve of the operative branch would stay open so that higher brake fluid pressure received from the master cylinder can be communicated to the associated brake cylinder. Break point C and curve $C_1$ represent the inherent bypass function characteristic for an unloaded vehicle, while break point D and curve $D_1$ represent the bypass characteristic for a loaded vehicle.

The present invention provides the high pressure damping required in case of a "spike" application of the brakes. During a "spike" application of the brakes, the fluid within pressure 100 would be communicated toward the inlet 29 and outlet 31 as the volume of chamber 100 decreases. The presence of chamber 100 and the fluid therein provides damping of any quick movement of piston 40 and cage member 60 in response to a "spike" application of the brakes. Because the flow of fluid out of variable volume chamber 100 would be at a controlled rate, the overshoot tendency which may occur when a "spike" application of the brakes occurs, is restricted.

The present invention eliminates completely the need for a reservoir and any channel between the reservoir and proportioning valve assembly. Because two proportioning valve assemblies are not utilized in side-by-side bores, there is reduced any side-to-side pressure differentials caused by any differences in the main springs utilized with the respective proportioning valve assemblies. The present invention utilizes a single main spring 200 which effects an equalizing force on each of the differential pistons, and provides the effect of a height sensing valve which provides a load on the second differential piston 140 as the first differential piston 40 moves downwardly. The fluid displacement losses are reduced by approximately one-half because a single assembly is utilized instead of a pair of pressure responsive assemblies in side-by-side bores. Additionally, there is improved bleedability when assembly 10 is installed.

Although this invention has been described in connection with the illustrated embodiment, it will be obvious to those skilled in the art that various changes may be made in the form, structure, and arrangement of parts without departing from the invention and the scope of the claims appended hereto.

We claim:

1. A pressure reducing valve assembly for a vehicle braking system, comprising a housing having a pair of inlets and a pair of outlets, first and second differential piston disposed at opposite ends of a bore within said housing and biased apart from one another by resilient means, first and second poppet valve means each associated with a respective differential piston, a cage member and a stationary piston disposed between said differential pistons, the cage member connected with said first poppet valve means and extending longitudinally to have an internal chamber with an inertia-sensing mass therein, the stationary piston connected with said second poppet valve means and engaging the cage member to define therewith a variable volume chamber, third poppet valve means disposed at an end of said variable volume chamber and engaged directly by the inertia-sensing mass and operable thereby, the valve assembly responsive to inlet and outlet pressures so that the valve assembly provides pressures at the outlets reduced from pressures at the inlets, and the inertia-sensing mass responsive to deceleration of the vehicle in order to effect closure of said third poppet valve means and cooperate in reducing the pressures at the outlets.

2. The pressure reducing valve assembly in accordance with claim 1, wherein the cage member further includes a ball valve member disposed therein and engaging said inertial sensing mass.

3. The pressure reducing valve assembly in accordance with claim 2, wherein the ball valve member is located adjacent a valve seat in the cage member.

4. The pressure reducing valve assembly in accordance with claim 1, wherein said first and second poppet valve means each include an end projection which abuts against a respective end wall of the housing.

5. The pressure reducing valve assembly in accordance with claim 4, wherein the housing includes a first end communicating with the bore, the first end enclosed by an end plug threadably received within the bore.

6. The pressure reducing valve assembly in accordance with claim 1, wherein the cage member has an opening through which an extension of said first poppet valve means extends, the first poppet valve means being biased away from the cage member by a spring therebetween.

7. The pressure reducing valve assembly in accordance with claim 1, wherein the cage member includes a longitudinal extension into which extends an end of said stationary piston, the end of the stationary piston retained therein by an abutment.

8. The pressure reducing valve assembly in accordance with claim 1, wherein the third poppet valve means is biased by a spring member into engagement with the inertia-sensing mass.

9. The pressure reducing valve assembly in accordance with claim 8, wherein the inertia-sensing mass comprises an annular member.

10. The pressure reducing valve assembly in accordance with claim 1, wherein a spring is disposed between said stationary piston and cage member to bias apart the cage member and stationary piston.

11. The pressure reducing valve assembly in accordance with claim 10, wherein the cage member includes an extension which extends within an opening of said first differential piston, and sealing means disposed between the extension and first differential piston.

12. The pressure reducing valve assembly in accordance with claim 11, wherein an end of the stationary piston includes a seal engaging the cage member in order to sealably define one end of said variable volume chamber.

13. The pressure reducing valve assembly in accordance with claim 12, wherein the stationary piston has an end which extends into an connects with the second poppet valve means.

14. The pressure reducing valve assembly in accordance with claim 1, wherein the stationary piston includes an enlarged diameter section, the enlarged diameter section received within complementary shaped openings in the second differential piston.

15. The pressure reducing valve assembly in accordance with claim 14, wherein the enlarged diameter section abuts with a shoulder formed in the bore of the housing.

16. The pressure reducing valve assembly in accordance with claim 15, further comprising a radial opening within said housing, the radial opening including an enclosure member which engages the enlarged diameter section of the stationary piston and permits ventilation therethrough.

17. The pressure reducing valve assembly in accordance with claim 1, wherein the second differential piston includes spacer means disposed thereabout between the second differential piston and a surface of said bore.

18. The pressure reducing valve assembly in accordance with claim 1, wherein the second poppet valve means is biased by resilient means away from said stationary piston.

19. The pressure reducing valve assembly in accordance with claim 18, wherein the second differential piston has sealing means disposed thereabout in order to effect a seal between a surface of the bore and the exterior diameter of said second differential piston.

20. The pressure reducing valve assembly in accordance with claim 1, wherein the variable volume chamber includes a mount receiving and positioning an end of a resilient spring biasing said third poppet valve means, the mount having openings for fluid flow therethrough.

21. In a vehicular dual proportioning valve assembly having a pair of inlets communicating with respective fluid pressure sources and a pair of outlets communicating with respective brake assemblies, a pressure responsive assembly disposed in a housing and cooperating with the inlets and outlets to vary fluid communication therebetween in response to pressurized fluid communicated to the inlets, and an inertia-sensing mass responsive to deceleration of the vehicle and cooperating with the pressure responsive assembly to assist in the variation of fluid communication between the inlets and outlets, the improvement comprising the pressure responsive assembly, including a first differential piston and a second differential piston biased apart by a spring, the pistons and spring disposed with a bore of the housing, the first differential piston receiving a first poppet valve connected with a cage member and the second differential piston receiving a second poppet valve connected with a stationary plunger, the stationary plunger engaging said cage member, the cage member having an internal chamber containing therein the inertia-sensing mass and the mass engaging a third poppet valve disposed between the mass and stationary plunger and the third poppet valve operated by the mass, the stationary plunger and cage member defining a variable volume chamber, movement of the cage member relative to the stationary plunger defining the volume of the variable volume chamber and said movement affected by displacement of the mass and third poppet valve.

22. A pressure reducing valve assembly for a vehicle braking system, comprising a housing having a pair of inlets and a pair of outlets, first and second pressure responsive assemblies disposed at opposite ends of a bore within said housing and biased apart by resilient means that imposes equal loading thereon, a cage member and a stationary plunger disposed between the pressure responsive assemblies and biased apart by spring means, the resilient means disposed about the cage member, stationary plunger, and spring means, the cage member cooperating with the first pressure responsive assembly and the stationary plunger cooperating with the second pressure responsive assembly, the first pressure responsive assembly and cage member displaceable by fluid pressure at the associated inlet in order to reduce fluid pressure at the associated outlet, the second pressure responsive assembly having a portion thereof displaced, relative to the stationary plunger, by fluid pressure at the associated inlet in order to reduce fluid pressure at the associated outlet.

23. The valve assembly in accordance with claim 22, wherein the stationary plunger is coupled to a poppet of said second pressure responsive assembly, the poppet controlling fluid flow through the second pressure responsive assembly.

24. The valve assembly in accordance with claim 23, wherein the cage member is coupled to a poppet that controls fluid flow through the first pressure responsive assembly.

25. The valve assembly in accordance with claim 24, wherein the cage member and stationary plunger define a variable volume chamber within the cage member.

26. The valve assembly in accordance with claim 25, further comprising poppet valve means engaged by an inertia-sensing mass within said cage member, the poppet valve means controlling fluid flow relative to the variable volume chamber.

27. The valve assembly in accordance with claim 22, wherein the cage member and stationary plunger include portions that are internested one within the other.

28. A pressure reducing vavle assembly for a vehicle braking system, comprising a housing having a pair of inelts and a pair of outlets, first and second pressure responsive assemblies disposed at opposite ends of a bore within said houisng and biased apart by resilient means, a cage member and a stationary plunger disposed between the pressure responsive assemblies and biased apart by spring means, the cage member cooperating with the first pressure responsive assembly and the stationary plunger cooperating with the second pressure responsive assembly, the cage member and stationary plunger including portions that are internested one within the other, the stationary plunger and second pressure responsive assembly internested one within the other, the first pressure responsive assembly and cage member displaceable by fluid pressure at the associated inlet in order to reduce fluid pressure at the associated outlet, the second pressure responsive assembly having a portion thereof displaced, relative to the stationary plunger, by fluid pressure at the associated inlet in order to reduce fluid pressure at the associated outlet.

29. A pressure reducing valve assembly for a vehicle braking system, comprising a housing having a pair of inlets and a pair of outlets, first and second pressure responsive assembliies disposed at opposite ends of a bore within said housing and biased apart by resilient means, a cage member and a stationary plunger disposed between the pressure responsive assemblies and biased apart by spring means, the cage member cooperating with the first pressure responsive assembly and the stationary plunger cooperating with the second pressure responsive assembly, the cage member comprising an interior chamber having an inertia-sensing mass engaging a ball valve disposed adjacent a valve seat, the first pressure responsive assembly and cage member displaceable by fluid pressure at the associated inlet inorder to reduce fluid pressure at the associated outlet, the second pressure responsive assembly having a portion thereof displaced, relative to the stationary plunger, by fluid pressure at the associated inlet in order to reduce fluid pressure at the associated outlet.

30. The valve assembly in accordance with claim 29, wherein the cage member and stationary piston define a variable volume chamber communicating via a valve with the interior chamber.

* * * * *